(12) United States Patent
Moon et al.

(10) Patent No.: US 11,511,729 B2
(45) Date of Patent: Nov. 29, 2022

(54) APPARATUS FOR CONTROLLING A HYBRID VEHICLE AND METHOD THEREOF

(71) Applicants: Hyundai Motor Company, Seoul (KR); Kia Motors Corporation, Seoul (KR)

(72) Inventors: Seong Wook Moon, Seoul (KR); Jeong Eun Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 217 days.

(21) Appl. No.: 17/032,453

(22) Filed: Sep. 25, 2020

(65) Prior Publication Data

US 2021/0309205 A1    Oct. 7, 2021

(30) Foreign Application Priority Data

Apr. 6, 2020 (KR) .......................... 10-2020-0041715

(51) Int. Cl.
*B60W 20/15*     (2016.01)
*B60W 10/08*     (2006.01)
(Continued)

(52) U.S. Cl.
CPC ............ *B60W 20/15* (2016.01); *B60W 10/02* (2013.01); *B60W 10/06* (2013.01); *B60W 10/08* (2013.01); *B60W 10/26* (2013.01); *B60W 20/13* (2016.01); *B60W 40/08* (2013.01); *B60W 50/085* (2013.01); *B60W 2510/244* (2013.01);
(Continued)

(58) Field of Classification Search
CPC ...... B60W 10/02; B60W 10/06; B60W 10/08; B60W 10/26; B60W 20/13; B60W 20/15; B60W 20/50; B60W 40/08; B60W 50/085; B60W 2510/244; B60W 2540/16;
(Continued)

(56) References Cited

U.S. PATENT DOCUMENTS 10,150,466 B2    12/2018 Kang et al.
10,214,204 B2    2/2019 Yun et al.
(Continued)

FOREIGN PATENT DOCUMENTS

KR          10-0831435 B        5/2008
KR     10-2017-0022219 A        3/2017
(Continued)

OTHER PUBLICATIONS

Notice of Allowance dated Sep. 1, 2020 in corresponding Koream Patent Application No. KR 10-2019-0132412.

*Primary Examiner* — Edwin A Young
(74) *Attorney, Agent, or Firm* — Fox Rothschild LLP

(57) ABSTRACT

An apparatus for controlling a hybrid vehicle and a method thereof are provided. The apparatus includes a hybrid starter & generator (HSG) controller that determines whether an HSG has failed, and a hybrid vehicle controller that controls reverse drive by controlling locking up an engine clutch and maintaining a main relay of a battery to be continuously turned on, based on whether a request for the reverse drive is input from a user. The hybrid vehicle controller changes and applies a vehicle torque control calculation method based on a state of charge (SoC) of the battery, when the HSG has failed.

19 Claims, 7 Drawing Sheets

(51) Int. Cl.
*B60W 10/02* (2006.01)
*B60W 10/26* (2006.01)
*B60W 10/06* (2006.01)
*B60W 20/13* (2016.01)
*B60W 40/08* (2012.01)
*B60W 50/08* (2020.01)
*F16D 48/06* (2006.01)

(52) U.S. Cl.
CPC ......... *B60W 2540/16* (2013.01); *F16D 48/06* (2013.01); *F16D 2500/10412* (2013.01); *F16D 2500/1107* (2013.01); *F16D 2500/50875* (2013.01)

(58) Field of Classification Search
CPC ........... F16D 48/06; F16D 2500/10412; F16D 2500/1107; F16D 2500/50875
See application file for complete search history.

(56) References Cited

U.S. PATENT DOCUMENTS

| | | |
|---|---|---|
| 10,501,069 B2 | 12/2019 | Choi et al. |
| 2014/0183941 A1* | 7/2014 | Bae ..................... B60L 15/2009 307/10.1 |
| 2016/0193925 A1* | 7/2016 | Takada .................. H02J 7/0014 429/61 |
| 2016/0303976 A1* | 10/2016 | Cha ........................ B60L 50/16 |
| 2017/0240160 A1* | 8/2017 | Park ........................ B60L 50/16 |
| 2019/0184810 A1 | 6/2019 | Yun et al. |

FOREIGN PATENT DOCUMENTS

| KR | 10-1836289 B | 4/2018 |
| KR | 10-1967452 B | 4/2019 |
| KR | 10-2019-0072748 A | 6/2019 |
| KR | 102175960 B1 | 11/2020 |

* cited by examiner

APPARATUS FOR CONTROLLING A HYBRID VEHICLE AND METHOD THEREOF

CROSS-REFERENCE TO RELATED APPLICATION

This application claims the benefit of priority to Korean Patent Application No. 10-2020-0041715, filed on Apr. 6, 2020, the entire contents of which are incorporated herein by reference.

TECHNICAL FIELD

The present disclosure relates to an apparatus for controlling a hybrid vehicle and a method thereof, and more particularly to a fail-safe strategy control technology when a hybrid vehicle malfunctions.

BACKGROUND

In general, a hybrid vehicle, which is a vehicle that uses the combination of two or more driving sources, employs an engine using fossil fuel and a motor generator using electric energy, as the driving sources. Recently, a hybrid vehicle having no reverse gear has been developed to reduce cost. In other words, reverse drive is possible based on the characteristic of a hybrid vehicle to drive a motor in a reverse direction. Accordingly, the reverse gear of a conventional transmission may be omitted, so the fuel efficiency may be improved and cost may be reduced. However, when power electronics (PE) parts, such as a hybrid starter & generator (HSG), malfunction or fail, the reverse drive is difficult, since the switch to HEV mode drive is performed by locking up an engine clutch according to a conventional fail-safe technique.

As illustrated in FIG. 1 of the related art, when the HSG of the hybrid vehicle fails, engine running is performed after an engine is started through engine clutch slip, and Main Relay Off control is performed in response to a request for Main Relay Off of a battery. In this case, the hybrid vehicle ensures the engine running by starting the engine through the engine clutch slip as it is difficult to start the engine through the HSG. Thereafter, when a main relay is turned on, the HSG is rotated through the engine running. Accordingly, since the battery may be overcharged due to back electromotive force generated from the HSG, the main relay is turned off. Accordingly, when the HSG fails in the hybrid vehicle having no reverse gear and when the above-described fail-safe strategy is performed, the main relay is turned off, and thus, the reverse drive using the motor is difficult.

SUMMARY

The present disclosure has been made to solve the above-mentioned problems occurring in the prior art while advantages achieved by the prior art are maintained intact. An aspect of the present disclosure provides an apparatus for controlling a hybrid vehicle having no reverse gear inside a transmission, capable of allowing reverse drive by continuously maintaining a main rely to be turned on and capable of preventing a battery from being overcharged by changing and applying a vehicle torque control calculation manner based on a state of charge (SOC) of the battery, when an HSG of the hybrid vehicle, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present, an apparatus for controlling a hybrid vehicle having no reverse gear inside a transmission may include a hybrid starter & generator (HSG) controller configured to determine whether an HSG fails, and a hybrid vehicle controller configured to perform reverse drive control by controlling locking up an engine clutch and maintaining a main relay of a battery in an on state, based on whether a request for the reverse drive is input from a user, and to change and apply a vehicle torque control calculation manner based on a state of charge (SoC) of the battery, when the HSG fails.

According to an exemplary embodiment, the hybrid vehicle controller may be configured to perform backward control by unlocking the engine clutch and maintaining the main relay in a turned on state, when the request for the reverse drive is input. The hybrid vehicle controller may be configured to perform forward control by locking up the engine clutch and maintaining the main relay in a turned on state, when the request for the reverse drive is not input. Additionally, the hybrid vehicle controller may be configured to determine whether the battery is in an overcharging state by determining whether the SoC of the battery exceeds a preset threshold, during driving with the engine clutch locked up.

The hybrid vehicle controller may be configured to split torque through a primary engine torque setting manner, when the battery is not in the overcharging state. In addition, the hybrid vehicle controller may be configured to set optimal running torque as engine torque and set a value, which is calculated by subtracting the engine torque from desired torque of a driver, as motor torque, when splitting the torque through the primary engine torque setting manner. The hybrid vehicle controller may be configured to split torque through a primary motor torque setting manner, when the battery is in the overcharging state.

Further, the hybrid vehicle controller may be configured to set, as motor torque, a maximum value of desired torque of a driver and a motor discharge available torque, and set, as engine torque, a value, which is calculated by subtracting the motor torque from the desired torque of the driver, when splitting the torque through the primary motor torque setting manner. Additionally, the hybrid vehicle controller may be configured to split the torque through a primary engine torque setting manner, when the battery is released from the overcharging state and becomes in a normal state.

According to an exemplary embodiment, the apparatus may further include a motor controller be configured to drive a motor based on motor torque output from the hybrid vehicle controller. The apparatus may further include a gear determining device configured to determine a gear state input by a driver. The apparatus may further include a battery controller configured to determine an On/Off state of the main relay and operate the battery.

According to another aspect of the present, a method for controlling a hybrid vehicle having no reverse gear inside a transmission, may include determining whether an HSG fails, controlling locking up an engine clutch, based on whether a request for reverse drive is input from a user, when the HSG fails, performing reverse drive control by maintaining a main relay of a battery in a turned on state, when the request for the reverse drive is input, performing forward control when the input of the request for the reverse drive is released, and changing and applying a vehicle torque control calculation manner based on a state of charge (SOC) of the battery.

According to an exemplary embodiment, the controlling of the locking up of the engine clutch may include unlocking the engine clutch and maintaining the main relay in a turned on state, when the request for the reverse drive is input, and locking up the engine clutch and maintaining the main relay in the turned on state, when the input of the request for the reverse drive is released. Additionally, the changing and applying of the vehicle torque control calculation manner may include determining whether the battery is in an overcharging state by determining whether the SoC of the battery exceeds a preset threshold, during driving with the engine clutch locked up.

The changing and applying of the vehicle torque control calculation manner may further include splitting torque through a primary engine torque setting manner, when the battery is not in the overcharging state. The splitting of the torque through the primary engine torque setting manner may include setting optimal running torque as engine torque and set a value, which is calculated by subtracting the engine torque from desired torque of a driver, as motor torque, when splitting the torque through the primary engine torque setting manner.

Further, the changing and applying of the vehicle torque control calculation manner may include splitting torque through a primary motor torque setting manner, when the battery is in the overcharging state. According to an exemplary embodiment, the splitting of the torque through the primary motor torque setting manner may include setting, as motor torque, a maximum value of desired torque of the driver and a motor discharge available torque, and set, as engine torque, a value, which is calculated by subtracting the motor torque from the desired torque of the driver, when splitting the torque through the primary motor torque setting manner.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
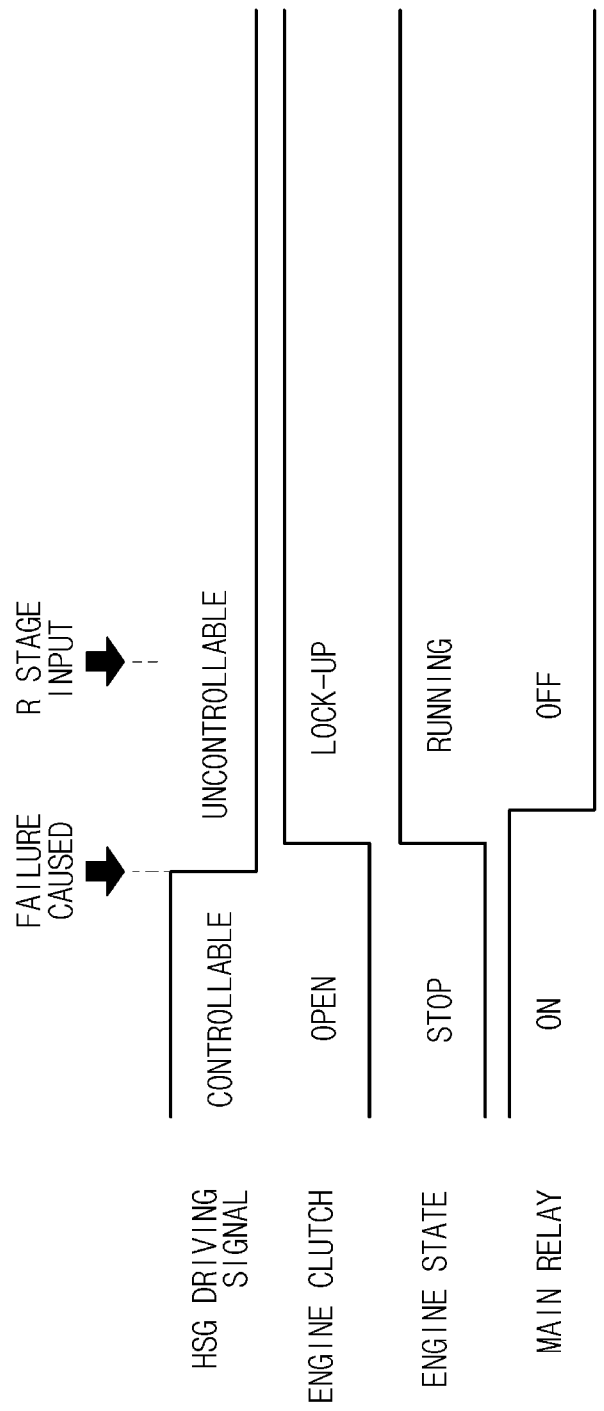
FIG. 1 is a timing diagram illustrating a fail-safe strategy of a typical hybrid vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a technology of preventing overcharging caused by HSG back electromotive force (EMF) resulting from an engine start, by changing a calculation manner (vehicle torque control calculation manner) for adjusting a vehicle torque without controlling Main Relay On/Off, after a hybrid vehicle having no reverse gear is uncontrollable due to the failure of HSG, and of performing forward control and reverse drive even when an HSG is failed.

Hereinafter, exemplary embodiments of the present disclosure will be described in detail with reference to FIGS. 2 to 7.

Figure 2:
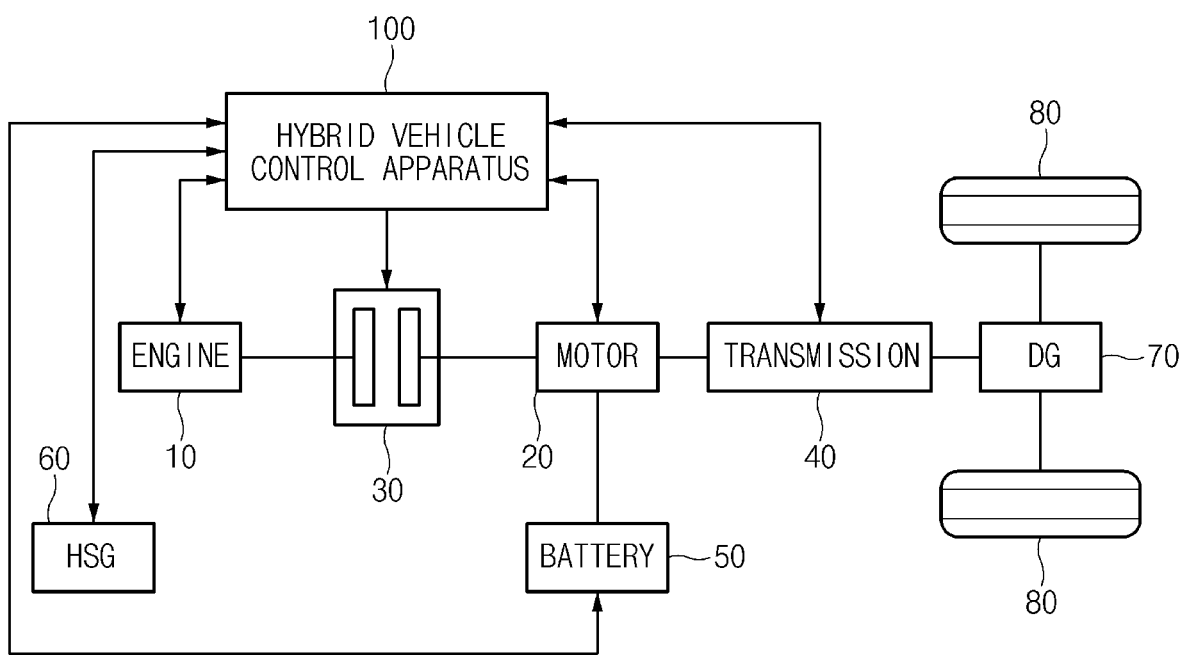
FIG. 2 is a block diagram illustrating a configuration of a hybrid vehicle system, according to an exemplary embodiment of the present disclosure.

FIG. 2 is a block diagram illustrating a configuration of a hybrid vehicle system, according to an exemplary embodiment of the present disclosure. Referring to FIG. 2, according to an exemplary embodiment of the present disclosure, the hybrid vehicle may include an engine 10, a motor 20, an engine clutch 30 to selectively connect the engine 10 or the motor 20, a transmission 40, a battery 50, a hybrid starter & generator (HSG) 60, a differential gear device 70, a wheel 80, and an apparatus (hybrid vehicle controller) 100 configured to operate a hybrid vehicle.

The hybrid vehicle provides operations, such as an electric vehicle mode to use only the power of a motor by locking up or unlocking the engine clutch based on an acceleration/deceleration intent of a driver based on operations of an accelerator pedal and a brake pedal, a vehicle speed, or a state of charge (SoC) of a battery; an engine mode (electric vehicle mode) to use only power of the engine; a hybrid electric mode (HEVE) mode to use the power of the engine as main power and to use the power of the motor as an auxiliary power; and a regenerative braking mode to recover braking energy and inertial energy through the power generation of the motor and to charge the battery, when the vehicle is decelerated or cruises through the braking of the vehicle or inertia.

The hybrid vehicle uses mechanical energy of the engine and electrical energy of the battery, uses the optimal running area of the engine and the motor, and recovers energy in braking, thereby improving the fuel efficiency and efficiently using energy. The hybrid vehicle may effectively travel at a preset time point, by determining engine torque and motor torque such that the engine runs at the optimal running point to satisfy the desired torque of the driver. The engine 10 generates power by burning fuel and, various engines such as a gasoline engine, a diesel engine, or a liquid propane injection (LPI) engine may be used as the engine 10.

The power transmission of the hybrid vehicle is performed by selectively transmitting torque generated from the engine 10 and/or the motor 20 to an input shaft of the transmission 40, and transmitting the torque, which is output from an output shaft of the transmission 40, to an axle through the differential gear device 70. As the axle rotates the wheel 80, the hybrid vehicle travels by the torque generated from the engine 10 and/or the motor 20. The battery 50 may be configured to supply electricity to the motor 20 in the EV mode and the HEV mode, and may be charged with the electricity recovered through the motor 20 in the regenerative braking mode. The HSG 60 may be configured to operate the engine 10 or generate power through the output of the engine 10. The HSG 60 may be referred to as an integrated starter & generator (ISG). The hybrid vehicle control apparatus 100 may be configured to perform forward control and backward control without controlling Main Relay On/Off, and may prevent overcharging caused by HSG back electromotive force (EMF) resulting from an engine start by changing a vehicle torque control calculation manner, after the HSG becomes uncontrollable due to the failure or malfunction thereof.

Figure 3:
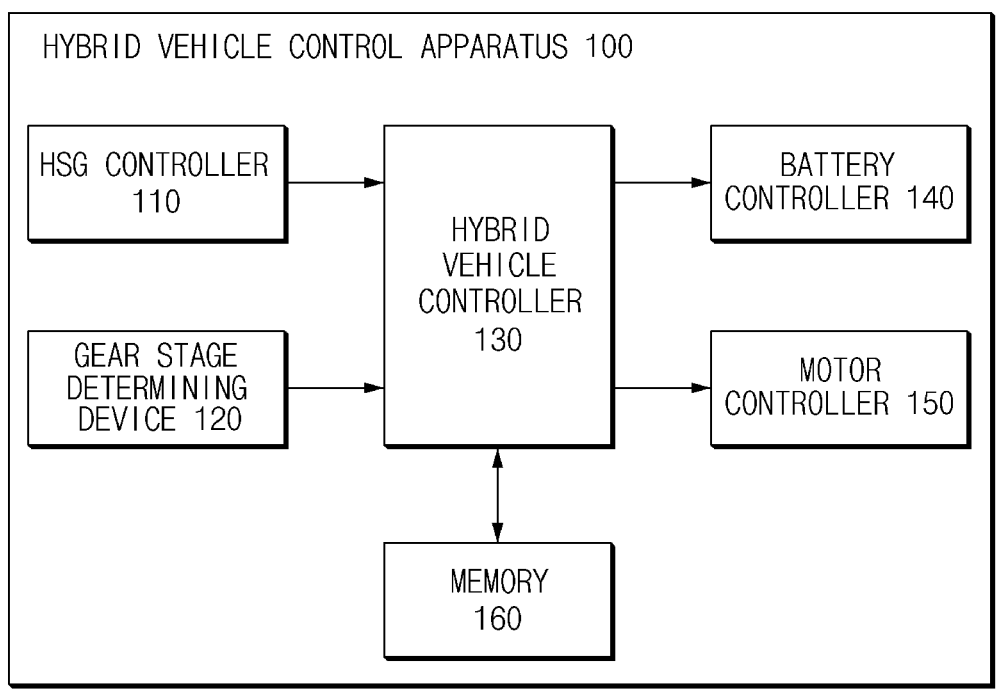
FIG. 3 is a block diagram illustrating a configuration of an apparatus for controlling a hybrid vehicle, according to an exemplary embodiment of the present disclosure.

FIG. 3 is a block diagram illustrating a configuration of an apparatus for controlling a hybrid vehicle, according to an exemplary embodiment of the present disclosure. Referring to FIG. 3, according to an exemplary embodiment of the present disclosure, the hybrid vehicle control apparatus 100 may include an HSG controller 110, a gear stage determining device 120, a hybrid vehicle controller 130, a battery controller 140, a motor controller 150, and a memory 160.

According to an exemplary embodiment of the present disclosure, the hybrid vehicle control apparatus 100 may be implemented inside a vehicle. In particular, the hybrid vehicle control apparatus 100 may be formed integrally with the internal control units of the vehicle or may be implemented separately from the internal controllers of the vehicle to be connected with the internal controllers of the vehicle via a separate connector.

Particularly, according to the present disclosure, the HSG controller 110, the gear stage determining device 120, the hybrid vehicle controller 130, the battery controller 140, and the motor controller 150, which are in the hybrid vehicle control apparatus 100, may be implemented with at least one processor. The HSG controller 110 may be configured to determine a failure and uncontrollable state of the HSG based on the state of an HSG driving signal received from the HSG.

The gear stage determining device 120 may be configured to determine a gear state input by a driver based on a signal received from a gear stage. The hybrid vehicle control apparatus 100 may be configured to determine a failure drive mode based on the HSG failure and the state of the battery, and perform engine On/Off and engine clutch control to be appropriate to a drive mode, to operate the vehicle. When the HSG determined to have failed (e.g., malfunction is detected), the hybrid vehicle controller 130 be configured to control locking up the engine clutch based on whether a request for reverse drive is input from a user, that is, based on an input state for the reverse gear, perform reverse drive control by continuously maintaining the main relay of the battery in a turned on state, and change and apply the vehicle torque control calculation manner.

The hybrid vehicle controller 130 may be configured to perform backward control (e.g., reverse drive control) in the state that the engine clutch is unlocked and the main relay is turned on (e.g., turned on state), when the input for the reverse gear is received. The hybrid vehicle controller 130 may be configured to lock up the engine clutch and perform forward control in Main Relay On, when the input for the reverse gear is not received. The hybrid vehicle controller 130 may be configured to determine whether the battery is overcharged (e.g., an overcharging state) by determining whether the SoC of the battery exceeds a preset threshold value, during driving with the engine clutch locked up.

The hybrid vehicle controller 130 may be configured to split torque through a manner (e.g., primary engine torque setting manner) of primarily setting engine torque when the battery is not in the overcharging state. The hybrid vehicle controller 130 may be configured to set the optimal running torque as the engine torque and set a value, which is calculated by subtracting the engine torque from the desired torque of the driver, as the motor torque, when splitting the torque through the primary engine torque setting manner.

Additionally, the hybrid vehicle controller 130 may be configured to split torque through a manner (e.g., primary motor torque setting manner) of primarily setting motor torque, when the battery is in the overcharging state. The hybrid vehicle controller 130 may be configured to set, as the motor torque, the maximum value of the desired torque of the driver and a motor discharge available torque, and may be configured to set, as the engine torque, a value, which is calculated by subtracting the motor torque from the desired torque of the driver, when splitting the torque through the primary motor torque setting manner. The hybrid vehicle controller 130 may be configured to split torque through the primary engine torque setting manner as the battery is released from the overcharging state and becomes in a normal state.

The battery controller 140 may be configured to determine an On/Off state (Main Relay On/Off) of a main relay of a battery, and operate the battery. The motor controller 150 may be configured to determine the state of a driving motor, and receive a motor torque value of the vehicle controller to operate the driving motor. The memory 160 may be configured to store determination results and calculation results of the HSG controller 110, the gear stage determining device 120, the hybrid vehicle controller 130, the battery controller 140, and the motor controller 150, and algorithms for the determination and calculation. The memory 160 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

As described above, according to an exemplary embodiment of the present disclosure, when the HSG of the hybrid vehicle having no reverse gear is failed, the reverse drive may be possible while the fail-safe drive performance may be ensured, during the failure drive mode. In addition, overcharging caused by a charging current resulting from the back electromotive force of the HSG may be prevented.

Figure 4:
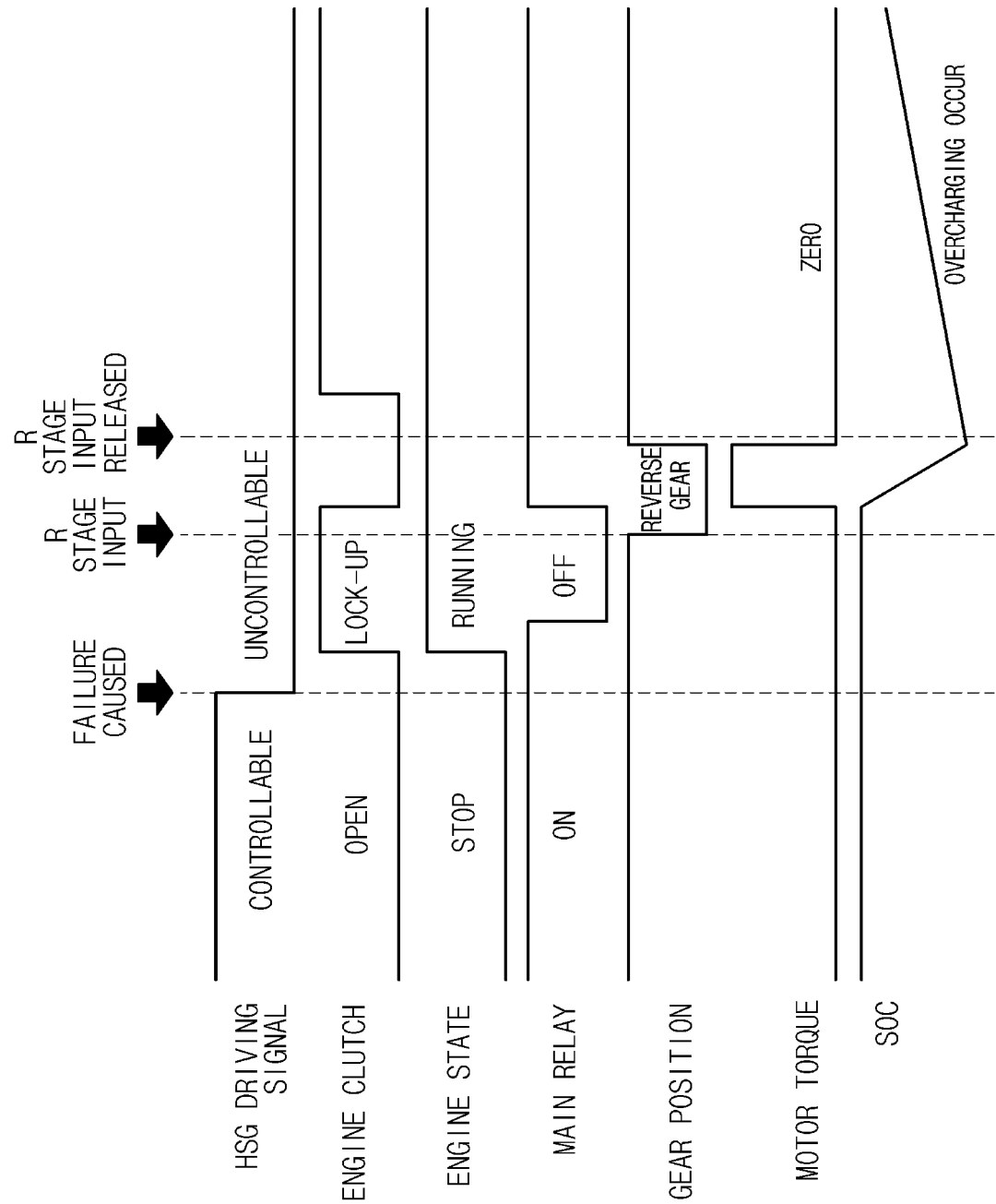
FIG. 4 is a timing diagram illustrating a fail-safe strategy of a hybrid vehicle, according to an exemplary embodiment of the present disclosure.

FIG. 4 is a timing diagram illustrating a fail-safe strategy of a hybrid vehicle, according to an exemplary embodiment of the present disclosure. Referring to FIG. 4, it may be recognized that, as the HSG becomes uncontrollable, an HSG driving signal may be disabled, the engine clutch may be locked up, and the engine may start through the motor start, before the reverse gear (e.g., the input of an R stage) is input by the driver. In particular, slip start may be performed through the engine clutch while a vehicle is driven. Thereafter, the main relay of the battery may be turned off to prevent the battery from being overcharged due to the HSG back electromotive force resulting from the engine start.

Thereafter, when the reverse gear (e.g., the input of the R stage) is input by the driver, the locked-up engine clutch may be unlocked (open) for reverse drive and the main relay of the battery for motor control may be reconnected and turned on. In particular, since the engine is maintained in a running state, although the charging current is applied due to the back electromotive force, the motor may be rotated due to the reverse drive. Accordingly, the SoC may be reduced during the reverse drive. In other words, since the motor consumption current is greater than an overcurrent generated from the HSG back electromotive force, it may be possible to prevent overcharging of the battery by the back electromotive in Main Relay On.

Thereafter, when the input of the R stage is released (e.g., movement to another gear stage), the engine clutch is locked up (engaged), and thus, the switch to the engine drive mode may be performed, and the main relay may be continuously maintained in the turned on state. Therefore, according to an exemplary embodiment of the present disclosure, the engine clutch may be locked up again to ensure the drive performance of an existing failure drive mode while maintaining the main relay to be in the On state (Main Relay On), thereby preventing the main relay from being frequently turned on/off.

However, as illustrated in FIG. 4, after the uncontrollable state occurs due to the failure of the HSG, a control strategy may be performed as in a previous strategy and then the main relay may be reconnected when the input of the R stage for the reverse drive is received. Thereafter, when the main relay is turned on even if the input of the R stage is released, and when the R stage for the reverse drive is input, the reverse drive may be possible through the use of the main relay. However, when the input of the R stage is released and when driving is continuously performed, a charging current may be generated from the back electromotive force of the HSG, thereby causing overcharging.

When a desired torque of the driver is greater than available motor torque, the engine outputs a torque to satisfy the desired torque, and the overcharging is caused due to the HSG back electromotive force resulting from the engine start. The overcharging may cause severe damage to a vehicle system. Accordingly, according to another exemplary embodiment of the present disclosure, the vehicle torque control calculation manner may be modified to make the reverse drive possible without reconnecting the main relay, thereby preventing the overcharging.

Figure 5:
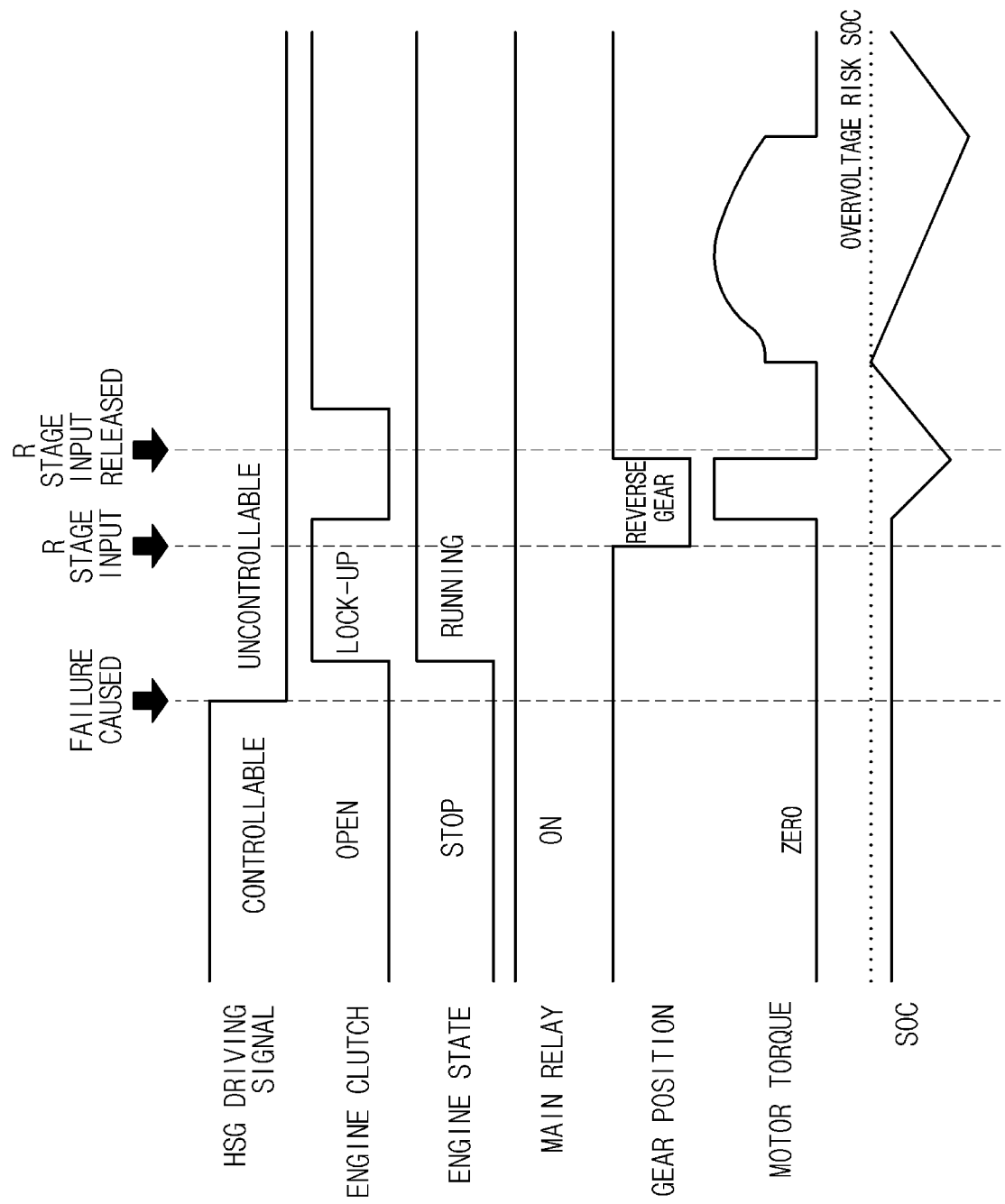
FIG. 5 is a timing diagram illustrating a fail-safe strategy of a hybrid vehicle, according to another exemplary embodiment of the present disclosure.

The following description will be made with reference to FIG. 5 regarding a manner to make the reverse drive possible without reconnecting the main relay after the uncontrollable state resulting from the failure of the HSG, by modifying the vehicle torque control calculation manner. FIG. 5 is a timing diagram illustrating a fail-safe strategy of a hybrid vehicle, according to another exemplary embodiment of the present disclosure.

Referring to FIG. 5, as the HSG becomes uncontrollable, the HSG driving signal may be disabled, the engine clutch may be locked up, and the engine may start through the motor start, before the reverse gear (e.g., the input of the R stage) is input by the driver. In particular, the hybrid vehicle control apparatus 100 may ensure the startability of the engine through a motor start during vehicle stop or through a slip start during the driving of the vehicle. Thereafter, when the reverse gear (e.g., the input of the R stage) is input by the driver, the locked-up engine clutch may be unlocked (open) for reverse drive but the main relay of the battery for motor control may be continuously maintained in the turned on state. Thereafter, when the input of the R stage is released (e.g., movement to another gear stage), the engine clutch is locked up (engaged), and thus, the switch to the engine drive mode may be performed, and the main relay may be continuously maintained in the turned on state.

At this time, since the engine maintains the running state, the charging current is generated from the back electromotive force of the HSG, but the motor rotation for reverse drive may be performed, thus decreasing the SoC during reverse drive. The hybrid vehicle control apparatus 100 may be configured to change a manner of splitting the desired torque of the driver, when an overvoltage is expected as the SoC of the battery is continuously monitored.

When the overvoltage risk is not expected, the hybrid vehicle control apparatus 100 may be configured to set the engine torque to torque at the optimal running point as in an existing manner of splitting the desired torque, and set motor torque to a value calculated by subtracting the engine torque from the desired torque of the driver. In other words, the hybrid vehicle control apparatus 100 may be configured to split torque by primarily setting the engine torque, as in the existing manner of splitting the desired torque, when the overvoltage risk is not expected.

When the overvoltage risk is expected, the hybrid vehicle control apparatus 100 may be configured to modify the method of splitting the desired torque to a method of setting and outputting the motor torque to the maximum value of the desired torque of the driver and a motor discharge available torque, and of calculating the engine torque by subtracting the motor torque from the desired torque of the driver. In other words, the hybrid vehicle control apparatus 100 may be configured to primarily set the motor torque, when the overvoltage risk is expected.

As described above, according to the existing method of splitting the desired torque, when the engine is turned on even though the motor is at a discharge-orientation running point, the motor may not use discharged power, due to the priority of the engine. However, according to the modified method of splitting the desired torque, even if the fuel efficiency is reduced in the fail-safe situation, the motor actively uses the discharged power to prevent the battery from being overcharged.

Figure 6:
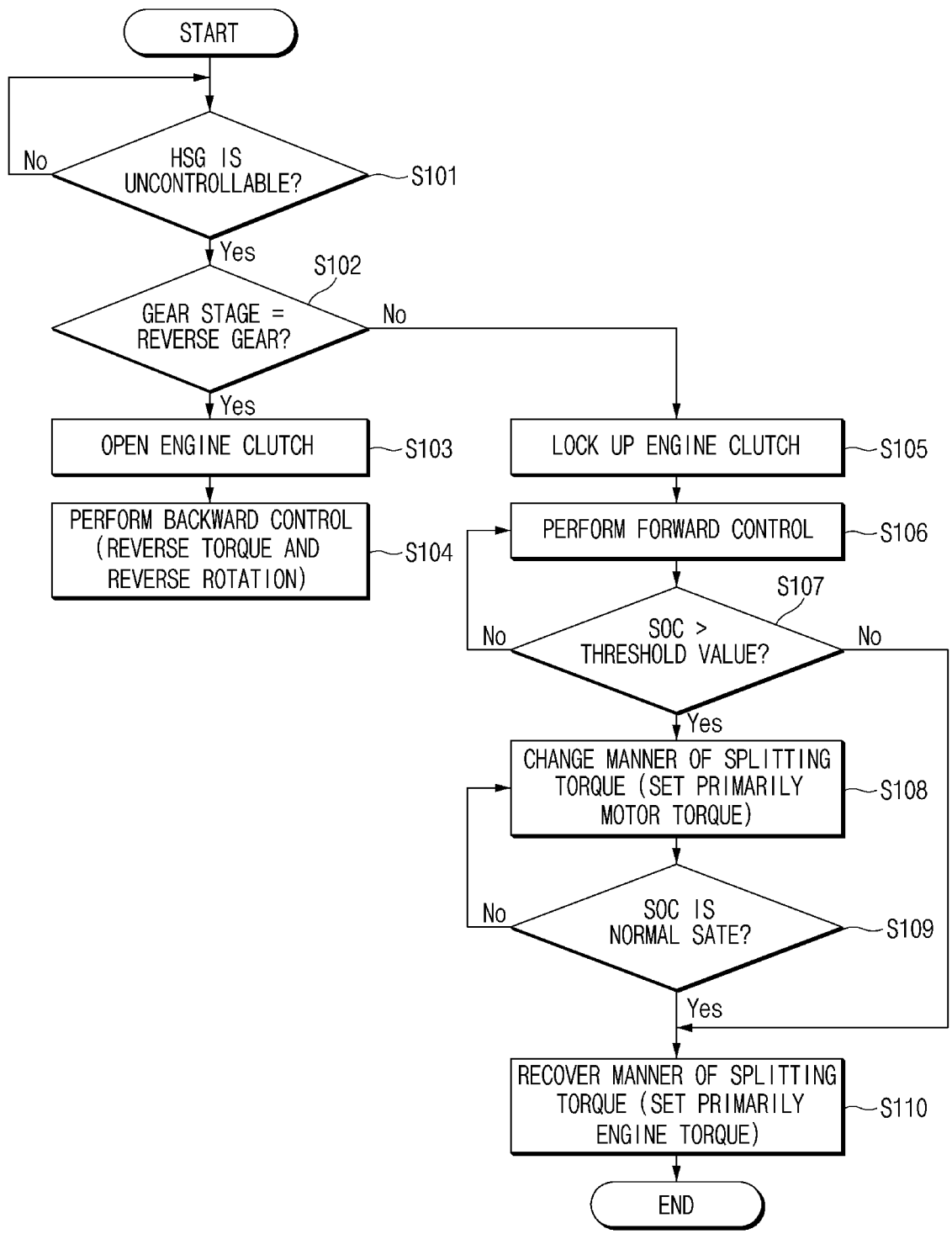
FIG. 6 is a flowchart illustrating a fail-safe control method of an apparatus for controlling a hybrid vehicle, according to an exemplary embodiment of the present disclosure.

Hereinafter, the fail-safe control method of the hybrid vehicle control apparatus will be described in detail with reference to FIG. 6, according to an exemplary embodiment of the present disclosure. FIG. 6 is a flowchart illustrating a fail-safe control manner of a hybrid vehicle control apparatus, according to an exemplary embodiment of the present disclosure. Hereinafter, it is assumed that the hybrid vehicle control apparatus 100 of FIG. 3 performs a processor of FIG. 6.

Referring to FIG. 6, the hybrid vehicle control apparatus 100 may be configured to determine whether the HSG is uncontrollable due to the failure of the HSG (S101) and determine whether a gearshift is in a reverse gear stage, when the HSG is uncontrollable (S102). In other words, the hybrid vehicle control apparatus 100 may be configured to determine whether the driver requests the reverse drive when the HSG has failed. In particular, the hybrid vehicle control apparatus 100 may be configured to determine the failure state of the HSG based on an enable state of the HSG driving signal received from the HSG, and determine the state of a gear based on a gear position signal received from the transmission.

When the gearshift is in the reverse gear stage, the hybrid vehicle control apparatus 100 may be configured to open the engine clutch (S103), and perform backward control (S104). In particular, a hybrid vehicle may be configured to perform the backward control through reverse torque and reverse rotation. In other words, the hybrid vehicle control apparatus 100 may be configured to output reverse torque for reverse drive and the engine may maintain the running state. Accordingly, even if the charging current is generated from the back electromotive force of the HSG, the motor may be rotated due to reverse drive. Accordingly, the SoC of the battery may be reduced during the reverse drive, thereby preventing the battery from being overcharged due to the back electromotive force of the HSG.

Meanwhile, when the gearshift is not in the reverse gear stage in S101, the hybrid vehicle control apparatus 100 may be configured to lock up the engine clutch (S105) and perform forward control of the hybrid vehicle (S106). When the desired torque of the driver is greater than available motor torque, the engine may be configured to output torque to satisfy the desired torque, and the overcharging may be caused due to the HSG back electromotive force resulting from the engine start. Accordingly, the following procedure to prevent the battery from being overcharged may be performed. The hybrid vehicle control apparatus 100 may be configured to determine whether the battery is overcharged by determining whether the SoC of the battery is greater than a predetermined threshold value (S107).

When the SoC of the battery is greater than the threshold value, that is, when the battery is in the overcharging state, the hybrid vehicle control apparatus 100 may be configured to change the method of splitting torque to the primary motor torque setting manner (S108). In other words, the hybrid vehicle control apparatus 100 may be configured to set the motor torque to the greater value of the desired torque of the driver and a motor discharge available torque, and set the engine torque to a value, which is calculated by subtracting the motor torque from the desired torque of the driver.

Accordingly, the hybrid vehicle control apparatus 100 may be configured to determine whether the SoC enters into a normal state. In other words, the hybrid vehicle control apparatus 100 may be configured to determine whether the SoC is changed to the normal state from the overcharged state (S109). When the SoC is changed to the normal state, the hybrid vehicle control apparatus 100 may be configured to change the method of splitting the torque to the primary engine torque setting manner, as in an existing manner (S110). In the primary engine torque setting manner or method, the hybrid vehicle control apparatus 100 may be configured to set the engine torque to the optimal running torque and set the motor torque to a value, which is calculated by subtracting the engine torque from the desired torque of the driver.

Meanwhile, when the SoC of the battery is equal to or less than the threshold value in S107, the hybrid vehicle control apparatus 100 may be configured to adjust the torque through the primary engine torque setting method which is an existing manner of splitting torque since the SoC of the battery is not the overcharging state. In particular, the main relay may be continuously maintained in the turned on state, during S101 to S110.

As described above, according to the present disclosure, the reverse drive is allowed by continuously maintaining the main rely in a turned on state, and the battery may be prevented from being overcharged by changing and applying the vehicle torque control calculation method based on the SoC of the battery, when an HSG of a hybrid vehicle having no reverse gear is failed. In addition, according to an exemplary embodiment, when gear shifting is performed to a stage other than the reverse gear stage (release from the R stage) after the reverse drive is performed, the switch to the engine drive mode may be performed by locking up the engine clutch again instead of opening the engine clutch, thereby ensuring drive performance.

Figure 7:
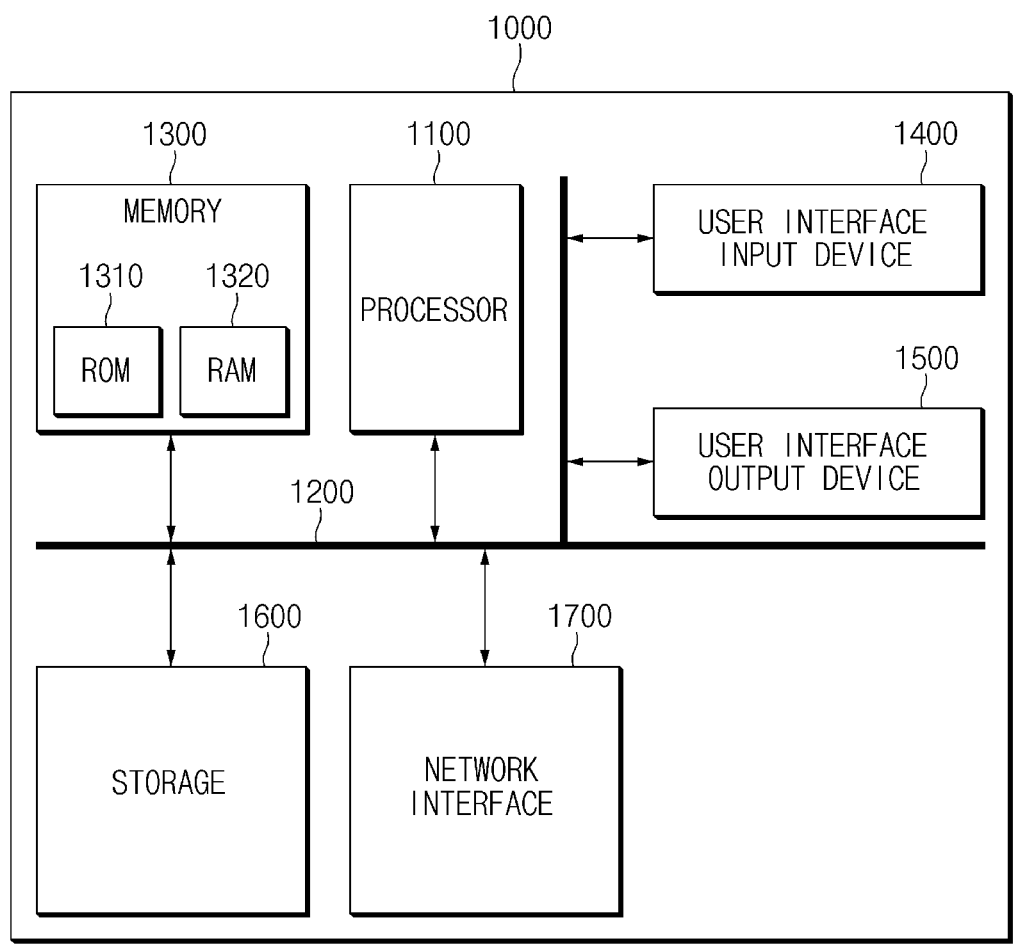
FIG. 7 illustrates a computing system, according to an exemplary embodiment of the present disclosure.

FIG. 7 illustrates a computing system, according to an exemplary embodiment of the present disclosure. Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and the storage medium may reside as separate components of the terminal of the user.

As described above, according to the present disclosure, the reverse drive may be allowed by continuously maintaining the main rely in a turned on state, and the overcharging of the battery may be prevented by changing and applying the vehicle torque control calculation manner based on an SoC of the battery, and the fail-safe drive performance may be improved, when the HSG of the hybrid vehicle having no reverse gear inside the transmission is failed.

Besides, a variety of effects directly or indirectly understood through the present disclosure may be provided. Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure

What is claimed is:

1. An apparatus for controlling a hybrid vehicle having no reverse gear inside a transmission, the apparatus comprising:
a hybrid starter & generator (HSG) controller configured to determine whether an HSG has failed; and
a hybrid vehicle controller configured to:
perform reverse drive control by controlling locking up an engine clutch and maintaining a main relay of a battery continuously in a turned on state, based on whether a request for the reverse drive is input from a user, and change and apply a vehicle torque control calculation method based on a state of charge (SoC) of the battery, in response to determining that the HSG has failed.

2. The apparatus of claim 1, wherein the hybrid vehicle controller is configured to:
perform backward control by unlocking the engine clutch and maintaining the main relay in the turned on state, in response to receiving the request for the reverse drive.

3. The apparatus of claim 1, wherein the hybrid vehicle controller is configured to:
perform forward control by locking up the engine clutch and maintaining the main relay in the turned on state, when the request for the reverse drive is not input.

4. The apparatus of claim 3, wherein the hybrid vehicle controller is configured to:
determine whether the battery is in an overcharging state by determining whether the SoC of the battery exceeds a preset threshold, during driving with the engine clutch locked up.

5. The apparatus of claim 4, wherein the hybrid vehicle controller is configured to:
split torque through a primary engine torque setting method, in response to determining that the battery is not in the overcharging state.

6. The apparatus of claim 5, wherein the hybrid vehicle controller is configured to:
set optimal running torque as engine torque and set a value, which is calculated by subtracting the engine torque from desired torque of a driver, as motor torque, when splitting the torque through the primary engine torque setting method.

7. The apparatus of claim 4, wherein the hybrid vehicle controller is configured to:
split torque through a primary motor torque setting method, in response to determining that the battery is in the overcharging state.

8. The apparatus of claim 7, wherein the hybrid vehicle controller is configured to:
set, as motor torque, a maximum value of desired torque of a driver and a motor discharge available torque, and set, as engine torque, a value, which is calculated by subtracting the motor torque from the desired torque of the driver, when splitting the torque through the primary motor torque setting method.

9. The apparatus of claim 8, wherein the hybrid vehicle controller is configured to:
split the torque through a primary engine torque setting method, when the battery is released from the overcharging state and switches to a normal state.

10. The apparatus of claim 1, further comprising:
a motor controller configured to drive a motor based on motor torque output from the hybrid vehicle controller.

11. The apparatus of claim 1, further comprising:
a gear determining device configured to determine a gear state input by a driver.

12. The apparatus of claim 1, further comprising:
a battery controller configured to determine an On/Off state of the main relay and operate the battery.

13. A method for controlling a hybrid vehicle having no reverse gear inside a transmission, the method comprising:

determining, by a controller, whether a hybrid starter & generator (HSG) has failed;

controlling, by the controller, locking up an engine clutch, based on whether a request for reverse drive is input from a user, in response to determining that the HSG has failed;

performing, by the controller, reverse drive control by maintaining a main relay of a battery continuously in a turned on state, in response to receiving the request for the reverse drive;

performing, by the controller, forward control when the input of the request for the reverse drive is released; and changing and applying, by the controller, a vehicle torque control calculation method based on a state of charge (SoC) of the battery.

14. The method of claim 13, wherein the controlling of the locking up of the engine clutch includes:

unlocking, by the controller, the engine clutch and maintaining the main relay in the turned on state, in response to receiving the request for the reverse drive; and locking up, by the controller, the engine clutch and maintaining the main relay in the turned on state, when the input of the request for the reverse drive is released.

15. The method of claim 13, wherein the changing and applying of the vehicle torque control calculation method includes:

determining, by the controller, whether the battery is in an overcharging state by determining whether the SoC of the battery exceeds a preset threshold, during driving with the engine clutch locked up.

16. The method of claim 15, wherein the changing and applying of the vehicle torque control calculation method further includes:

splitting, by the controller, torque through a primary engine torque setting method, in response to determining that the battery is not in the overcharging state.

17. The method of claim 16, wherein the splitting of the torque through the primary engine torque setting method includes:

setting, by the controller, optimal running torque as engine torque and set a value, which is calculated by subtracting the engine torque from desired torque of a driver, as motor torque, when splitting the torque through the primary engine torque setting method.

18. The method of claim 15, wherein the changing and applying of the vehicle torque control calculation method further includes:

splitting, by the controller, torque through a primary motor torque setting manner, in response to determining that the battery is in the overcharging state.

19. The method of claim 18, wherein the splitting of the torque through the primary motor torque setting manner includes:

setting, by the controller, as motor torque, a maximum value of desired torque of a driver and a motor discharge available torque; and setting, by the controller, as engine torque, a value, which is calculated by subtracting the motor torque from the desired torque of the driver, when splitting the torque through the primary motor torque setting manner.

* * * * *